United States Patent

Fukita et al.

[11] Patent Number: 5,832,108
[45] Date of Patent: Nov. 3, 1998

[54] PATTERN RECOGNITION METHOD USING A NETWORK AND SYSTEM THEREFOR

[75] Inventors: Masayuki Fukita, Tokyo; Kazuharu Toyokawa, Yamato; Shin Katoh, Tokyo, all of Japan

[73] Assignee: International Business Machines Corporation, Armonk, N.Y.

[21] Appl. No.: 707,888

[22] Filed: Sep. 9, 1996

Related U.S. Application Data

[63] Continuation of Ser. No. 296,837, Aug. 26, 1994, abandoned.

[30] Foreign Application Priority Data

Aug. 26, 1993 [JP] Japan .................................... 5-211386

[51] Int. Cl.$^6$ ........................................ G06K 9/62
[52] U.S. Cl. ........................ 382/159; 382/181; 382/155; 382/156
[58] Field of Search .................................... 382/155, 190, 382/209, 217, 277, 279, 156, 173, 181, 159; 364/602

[56] References Cited

U.S. PATENT DOCUMENTS

| | | | |
|---|---|---|---|
| 3,484,746 | 12/1969 | Fralick | 340/146.3 |
| 5,058,180 | 10/1991 | Khan | 382/14 |
| 5,060,278 | 10/1991 | Fukumizu | 382/14 |
| 5,157,733 | 10/1992 | Takeo et al. | 382/14 |
| 5,181,256 | 1/1993 | Kamiya | 382/14 |
| 5,255,342 | 10/1993 | Nitta | 395/2 |
| 5,309,525 | 5/1994 | Shimomura et al. | 382/14 |
| 5,321,773 | 6/1994 | Kopec et al. | 382/14 |
| 5,487,117 | 1/1996 | Burges et al. | 382/173 |

FOREIGN PATENT DOCUMENTS

| | | | |
|---|---|---|---|
| EP-A-0328861 | 8/1989 | European Pat. Off. | G06K 9/64 |
| GB-A-2085628 | 4/1982 | United Kingdom | G10L 1/00 |

*Primary Examiner*—Jose L. Couso
*Assistant Examiner*—Anh Hong Do
*Attorney, Agent, or Firm*—Ronald L. Drumheller

[57] ABSTRACT

An interval [0, 1] of the output of neural network is equally divided into M (M being an integer of two or more), and the numbers or frequencies of data for the correct/incorrect patterns contained in the i-th interval [(i−1)/M, i/M] are $\mu 1i$ and $\mu 0i$, respectively (where, i=1 ... M). In this case, if this network provides an output contained in the i-th interval to unknown pattern data, this pattern is stored as a likelihood conversion table so that the pattern outputs likelihood P1i, which is a category, in an equation $P1i=(\mu 1i+1)/(\mu 1i+\mu 0i+2)$. Then, when a value contained in the i-th interval [(i−1)/M, i/M] is output from a neural network, the likelihood convertor receives it as an input and outputs P1i which is so to speak normalized likelihood.

10 Claims, 6 Drawing Sheets

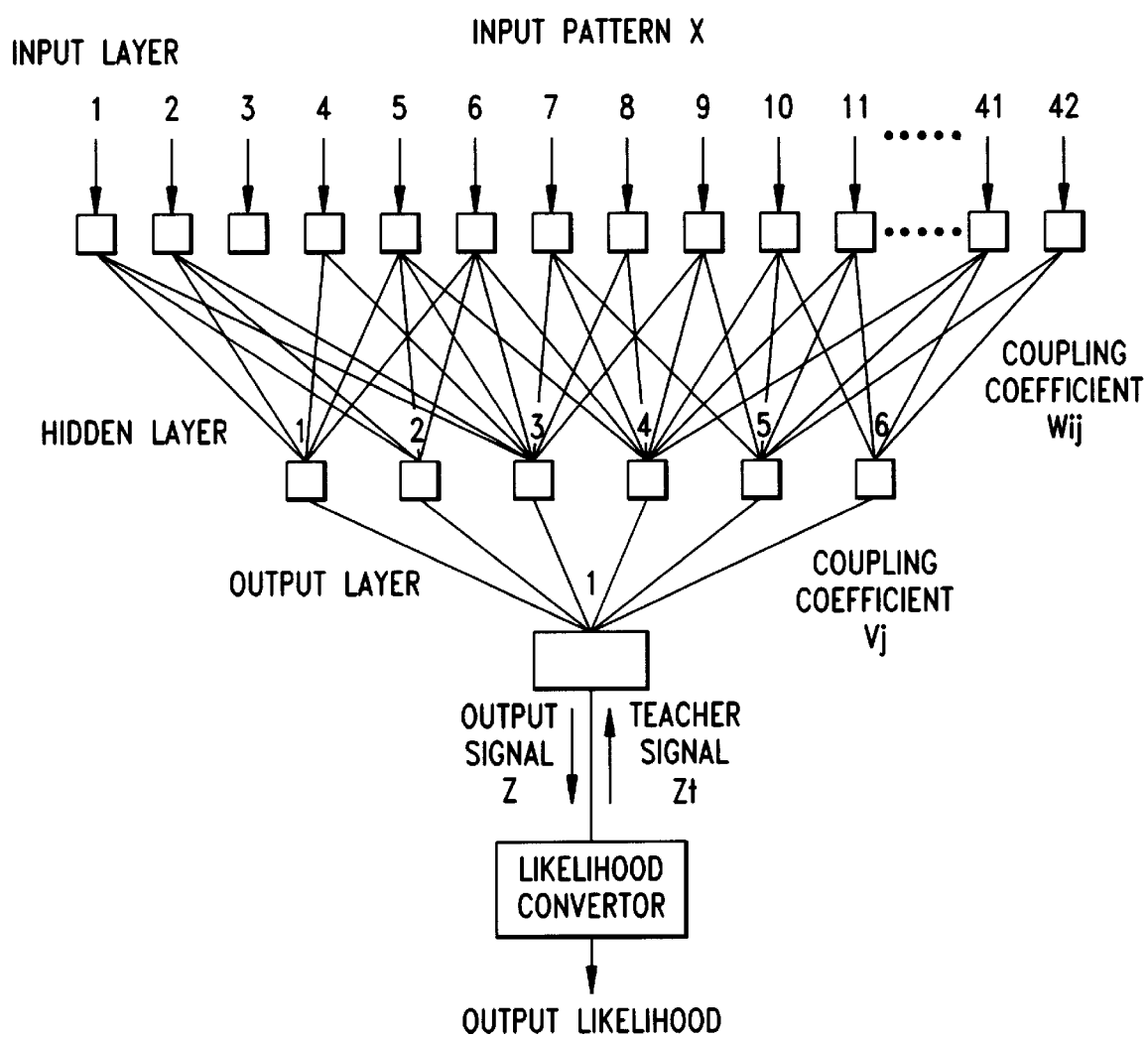

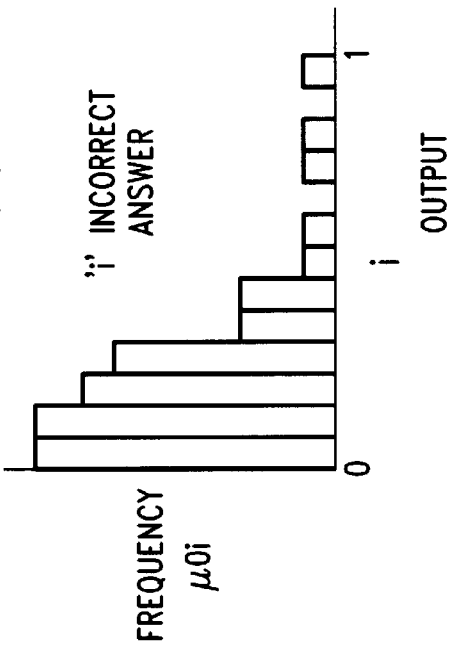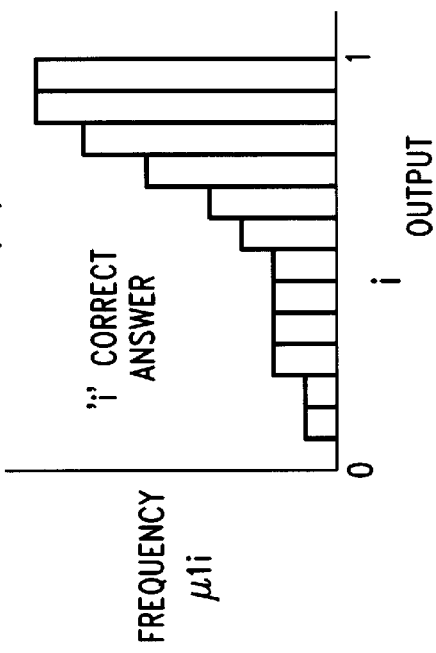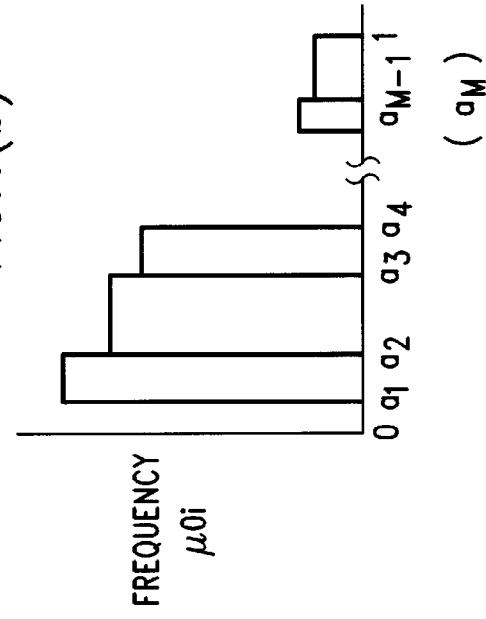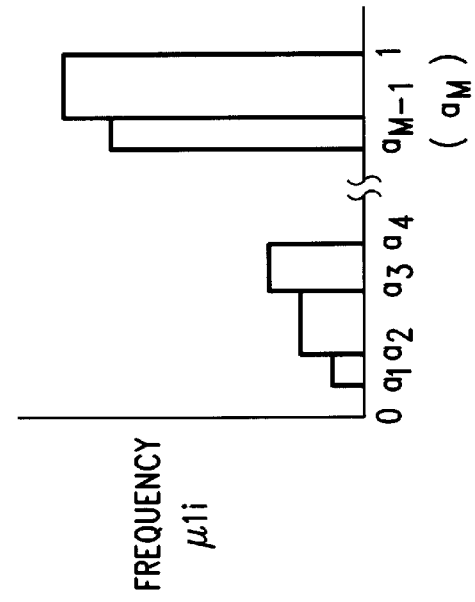

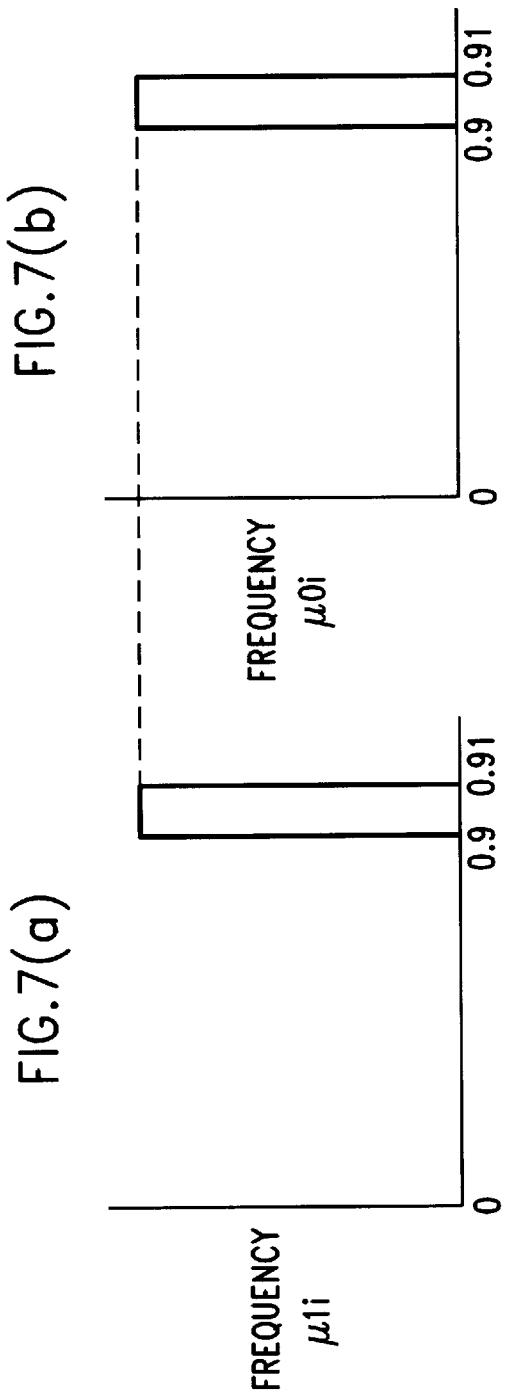

$$P_1(x) = b_0 x^n + b_1 x^{n-1} + \cdots + b_n$$

PATTERN RECOGNITION METHOD USING A NETWORK AND SYSTEM THEREFOR

This is a continuation of application Ser. No. 08/296,837, filed Aug. 26, 1994, now abandoned.

BACKGROUND OF THE INVENTION

1. Field of the Invention

The present invention relates to a neural network, and more particularly, to an improvement in pattern recognition using a neural network.

2. Related Art

It has been known that, when a neural network is applied to pattern recognition, if a category set to be identified is not so large (for example, on the order of 50 categories), a pattern identification system with higher accuracy can be implemented by a single network in an attainable learning process and a period of time (see, for example, I. Guyon, P. Albrecht, Y. Le Cun, J. Denker, and W. Hubbard: "Design of a Neural Network Character Recognizer for a Touch Terminal," Pattern Recognition, Vol. 24, pp. 105–119, 1991). However, this approach has difficulty in attaining a pattern identification system which can be put in practical use for a system having several hundred categories of patterns to be identified, such as identification of similar hand written characters in Japanese.

Then, the method conventionally practiced for identifying patterns with many categories is one which first roughly classifies all categories into several classes, and uses a separate neural network for each class for detailed identification (Y. Kojima, T. Koda, H. Takagi, and Y. Shimegi: "A Study on Generalizability of Neural Networks," Proceedings of National Meeting of IECE Japan 1990, 6–5; I. Hayashi: "Method for Integrating a Neural Network and Fuzzy Control," Electronics Technology, 1992-1, pp. 17; and A. Iwata, T. Toma, K. Matsuo, and N. Suzumura: "A Large Scale Four Layer Neural Network-CombNET," The Transactions of IECE Japan, Section J, D-II, Vol. 73-D-II, pp. 1261–1267, 1991-20). This is a method which adopts a category providing the largest output in networks selected for rough classification as a correct candidate. However, this method has such a problem that, because learning by a network is performed for a limited amount of learning data, the degree of learning necessarily differs from one network to another so that it becomes difficult to determine the result of identification merely by comparing outputs among a number of networks.

Additional publications relating to pattern recognition using neural networks includes the following.

PUPA No. 3-67381 relates to a character recognition system suitable for recognizing hand written or printed character patterns composed of two-dimensional dot matrices such as those read by an image scanner. It discloses to extract characteristics from hand written or printed character patterns read by an image scanner with a characteristic extraction method, to output the results from each cell on a characteristic extraction plane, to input the information into each neuron in the input layer of the layered neural network thereby propagating signals into the neural network, to cause each neuron in the neural network to output the result of recognition, and to vary intensity of linking between each neuron according to the back-propagation learning scheme until the correct recognition result is obtained.

PUPA No. 3-88090 discloses a character recognition system for determining a plurality of character pattern candidates with high confidence as a result of recognition of input patterns from similarity between an input character pattern and a plurality of character patterns, the system of which comprises a plurality of subneural nets, each of which groups each character pattern candidate into similar character groups, carries out learning in such a manner that, for each group, a character pattern candidate, which should originally have the greatest degree of similarity, can be obtained based on the degree of similarity as a final character candidate, and judges a plurality of character pattern candidates with high degree of confidence for each group; a neural net which carries out learning in such a manner that the result of judgment by said subneural nets containing the character pattern candidate, which should originally have the greatest degree of similarity, becomes one of said character recognition candidates, and judges a subneural net which contains the character pattern candidate with the highest degree of confidence; and a judging means which judges a plurality of character pattern candidates with a high degree of confidence as the final character recognition candidate from the judgment result of said subneural nets.

PUPA No. 4-42381 discloses a character recognition system for characters on paper which comprises a characteristic extracting means for extracting divisional characteristic values of characters, which are previously classified into classes, a classification storage means for storing characteristic values which are reference characteristic values for the classes, a classification means for determining a class to which the character pattern belongs based on the output from the characteristic extracting means, a neural network identification means for assigning classified characters to an output layer node and for recognizing a character according to the activity of the output layer node with a high degree of matching based on the characteristic value from said characteristic extracting means, and a judging means for judging the character for the character pattern based on the output from the classification means and the result of said neural network identification means, and for outputting the information on the judged character.

However, all of these publications fail to teach a method for providing comprehensive judgment criteria with output from separate neural networks provided for each of the classes.

SUMMARY OF THE INVENTION

It is an object of this invention to improve the recognition ratio in pattern recognition in a pattern recognition system using separate neural networks for each class.

It is another object of this invention to provide in a system using separate neural networks for each class a means which eliminates variations between outputs of the neural networks for each class, and allows integrated (statistical) processing of the separate neural networks.

The above objects can be attained through likelihood conversion of outputs from the separate neural networks for each class according to this invention.

That is, first, separate feed-forward type networks are provided for the class of each pattern. The output layer of each network is caused to learn with learning data in such a manner that each category provides an output corresponding to a "correct answer." For example, it is caused to learn by supplying a teacher signal of "1" for a correct answer and "0" for an incorrect answer.

Then, a likelihood convertor is connected to the rear stage of the output layer as shown in FIG. 1 to convert the output of each neural network into a likelihood. Each of the likelihood convertors is adjusted for the network, which has completed learning, so that the likelihood convertor outputs a likelihood of a correct answer for each category.

One example of adjustment is as follows. Learning pattern data of correct and incorrect answers is provided in the same amount for the network for each category to take a histogram of output distribution. Then, the output takes a value from 0 to 1 depending on the pattern data. Here, it is assumed that an interval [0, 1] is equally divided into M (M being an integer of two or more), and that the numbers or frequencies of data for the correct/incorrect patterns contained in the i-th interval [(i−1)/M, i/M] are $\mu 1i$ and $\mu 0i$, respectively (where, i=1 ... M). In this case, if this network provides an output contained in the i-th interval to unknown pattern data, this pattern is stored as a likelihood conversion table so that the pattern outputs likelihood P1i, which is a category, in an equation P1i=($\mu$1i+1)/($\mu$1i+$\mu$0i+2). Then, when a value contained in the i-th interval [(i−1)/M, i/M] is output from a neural network, the likelihood convertor receives it as an input and outputs P1i which is, so to speak, the normalized likelihood.

Because the intervention of such likelihood convertor makes it possible for each network to be adjusted to output likelihood, the variation of learning is corrected for the networks so that the output from each network can be compared with each other. That is, a category providing the highest likelihood can be determined to be the most probable candidate.

BRIEF DESCRIPTION OF THE DRAWINGS

FIG. 3 is a block diagram of the 3-layer neural network and a likelihood convertor connected with it;

FIG. 5 is a drawing showing an example of histogram with fixed intervals used for forming a likelihood convertor;

FIG. 6 is a drawing showing an example of histogram with unequal intervals used for forming a likelihood convertor;

FIG. 7 is a drawing showing a histogram in a very special output example of neural network;

DESCRIPTION OF THE PREFERRED EMBODIMENTS

In the following, description is made for an example where the present invention applies to similar character identification for handwritten Japanese characters. As seen from the system configuration illustrated in the block diagram of FIG. 1, rough classification is carried out in the front stage by pattern matching, and correct character candidates are determined by a neural network group in which each network has a likelihood convertor in the rear stage according to the present invention.

Figure 1:
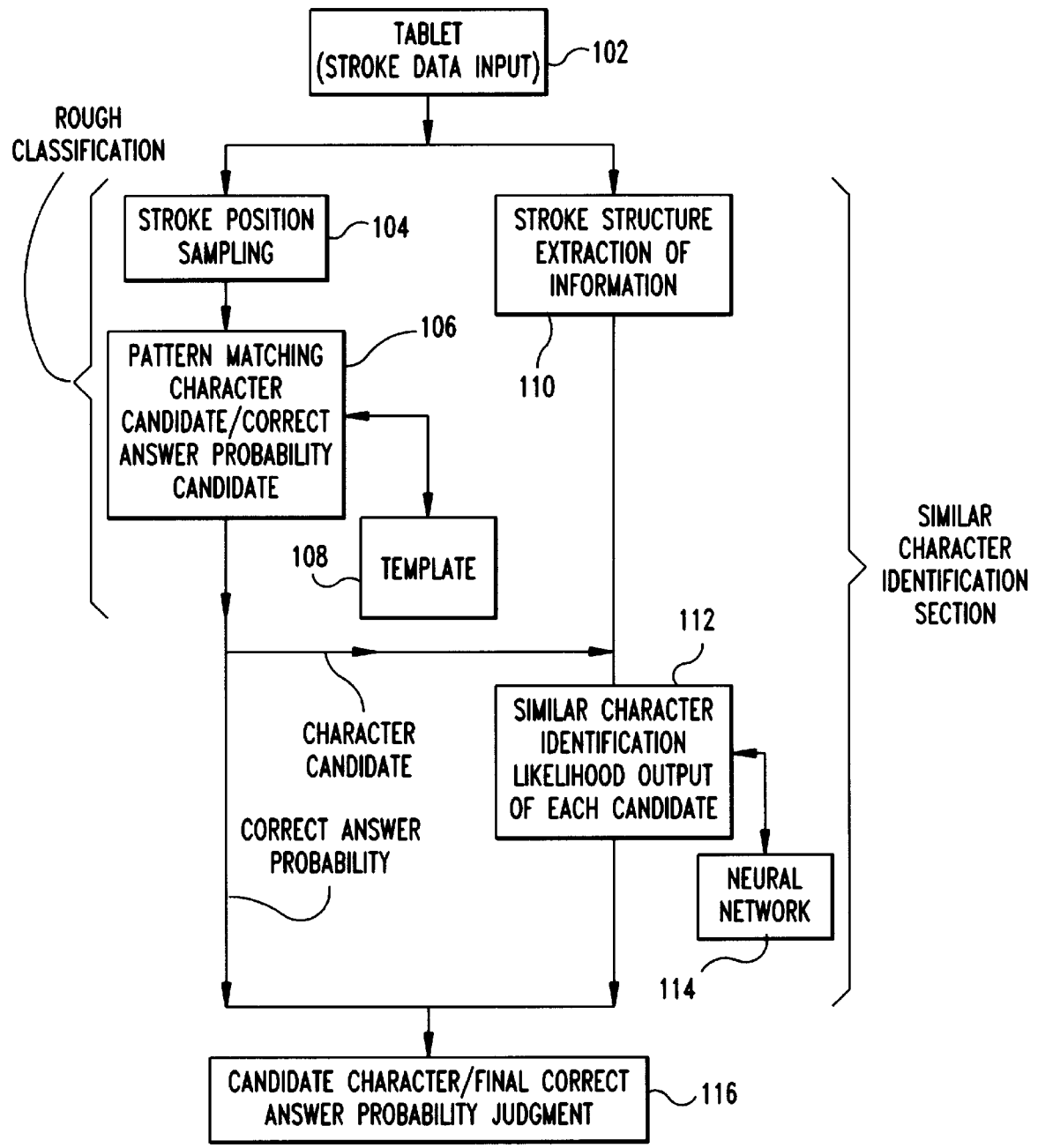
FIG. 1 is a block diagram illustrating the process of the invention.

Referring to FIG. 1, in a block 102, stroke data is pen input by using a tablet.

Then, in a block 104, the data input from the tablet (time series data of stroke positions X and Y) is, as described in PUPA No. 3-327680, coded for each of its strokes, and the position (P)/direction (D)/length (L), and compared with the results of logical OR taken for all of (P)/(D)/(L) against learning data which has been previously collected for each character category and number of strokes, whereby categories not matching input data are dropped from the candidate categories. This processing is herein called a "PDL filter." To care with the many variations in hand written characters, the learning data requires character samples hand written by as much as 100 writers for all characters. For convenience, it is assumed hereafter that there are 100 samples for each character category.

Then, in a block 106, the input data is resampled for six point equal distance/stroke, and compared with a template 108 which is formed by similarly sampling each category and number of strokes for six point equal distance/stroke with the learning data, and by taking their average (in general, separate templates being prepared even for the same character category according to the variation in the number of strokes and the order of making the strokes). In this case, the comparison is not carried out with the template for all character categories, but rather the distance with the remaining candidates in the PDL filter is found by the following equation:

$$Dxt = \frac{1}{n} - \sum_{i=1}^{n} \sum_{j=1}^{6} dxtij \qquad \text{[Equation 1]}$$

where

Dxt: Distance between input data x and template t dxtij: Distance between input data x, and the i-th stroke and the j-th sample point in template t n: Number of strokes in input data The distance is arranged in the ascending order to each template of Dx1, Dx2, ... Dxi, ... Here, the normalized distance $\Delta xi$ (i=1, 2, ... ) is:

$$\Delta xi = (Dxi - Dx1)/Dx1 \qquad \text{[Equation 2]}$$

The probability of correct answer of recognition for the i-th candidate Pxi is:

$$Pxi = F(\Delta xi) \qquad \text{[Equation 3]}$$

F (x) is a monotonously decreasing function of x independent of the character category. Because it is considered that each character pattern will be normally distributed in a characteristic space, the distribution of pattern s is:

$$Ds(x) = \frac{1}{\sqrt{2\pi}\ \sigma_s} + e^{-\frac{1}{2}\left(\frac{x}{\sigma_s}\right)^2} \qquad \text{[Equation 4]}$$

where, $\sigma_s$ is variance, and the system of coordinates for the characteristic space has, conveniently, its origin at the center of distribution of the pattern s.

Distribution of a pattern f which is liable to be mistaken as the pattern s because it is close to the pattern s in the characteristic space is:

$$Df(x) = \frac{1}{\sqrt{2\pi}\ \sigma_f} - e^{-\frac{1}{2}\left(\frac{x-x_o}{\sigma_f}\right)^2} \qquad \text{[Equation 5]}$$

where $\sigma_f$ is variance, and the center of distribution of the pattern f is at xo. In this case, when the characteristics of a pattern is given by x, the probability of correct answer F (x) of this pattern being s is given by:

$$F(x) = Ds/(Ds+Df) \quad \text{[Equation 6]}$$

In an actual pattern recognition system, F (x) is approximated by:

$$F(x) \approx \frac{1}{1 + A \cdot e^{-\left(\frac{x}{B}\right)^2}} \quad \text{[Equation 7]}$$

Where the coefficients A and B are experimentally determined from the learning data. Only categories within a certain threshold value Δth to the normalized distance are left as candidates by the pattern recognition interval. Thus, as shown in FIG. 1, these candidate categories are output from the block 106 to a similar character identification detail block 112, and the probability of correct answer to a correct answer probability determination block 116.

Now, identification of similar characters by a neural network will be described. As pre-processing for identifying similar characters by a neural network, stroke structure information is extracted in a block 110. More particularly, information such as stroke shape information and relative position information between strokes as described in IBM Technical Disclosure Bulletin (hereinafter called "IBM TDB") NO. 1b, June 1992, pp. 228–232, and IBM TDB NO. 1b, June 1992, pp. 220–227 is extracted to produce characteristic vectors. Examples of characteristics are listed in Table 1 below. This embodiment uses 42 characteristics in total, each of which is coded in an 8-bit integer. In this embodiment, the first characteristic or the number of strokes, for example, has a probability one, two, or three strokes to which integer values of 64, 128, and 192 are assigned, respectively. In Table 1, numerals in parentheses at the left show the byte position of each characteristic in the entire 42-byte characteristics. In addition, in Table 1, characteristics not directly relating to this invention are omitted, and therefore, some byte positions are skipped.

TABLE 1

| | | |
|---|---|---|
| (1) | Number of strokes | 1–3 |
| (2) | Number of points | 0, 1, 2 |
| (3) | Number of closed curves | 0, 1 |
| (4) | Number of horizontal lines | 0, 1, 2, 3 |
| (5) | Number of vertical lines | 0, 1, 2 |
| (6) | Number of right arcs | 0, 1, 2 |
| (7) | Number of left arcs | 0, 1, 2 |
| (8) | Number of long arcs | 0, 1, 2 |
| (9) | Number/direction of acute angles | 0, 1, 2, 3 |
| ... | ... | ... |
| (12) | Existence of voiced sound symbols | 0, 1 |
| (13, 14) | Starting/ending direction of character | −1, 0, 1, −7 |
| (15) | Total of stroke length | 0–7 |
| (16) | Ratio of longest strokes in total | 0–7 |
| (17) | Number of transfer points in curves | 0, 1 |
| (18) | Existence of semivoiced sound symbols | 0, 1 |
| (19–23) | Relative position between strokes (top/right/bottom/left/contact) (Stroke 1 vs. stroke 2) | 0, 1 |
| (24–28) | Relative position between strokes (top/right/bottom/left/contact) (Stroke 2 vs. stroke 3) | 0, 1 |
| ... | ... | ... |
| (38, 39) | Center of gravity position to character frame (X, Y) | 0–100 |
| (40, 41) | Area of circumscribed rectangular to area of character frame | 0–100 |
| (42) | Ratio of width/height to character frame | 0–100 |

Figure 2:
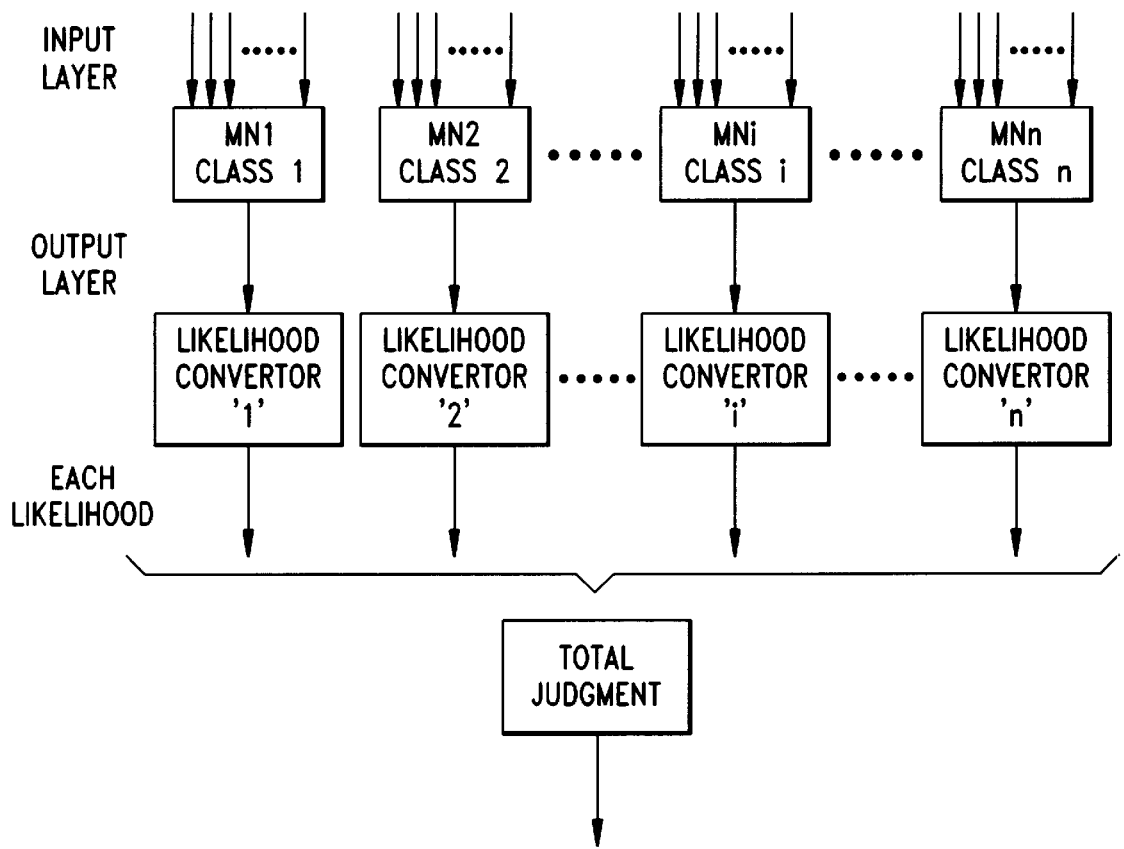
FIG. 2 is a block diagram of the neural network connected with a likelihood convertor relating to the invention.

Now, the network structure for identifying similar characters will be described. Referring to FIG. 1, in the block 112, the candidates output from the block 106 are examined for probability of correctness of each candidate on the basis of the characteristics extracted in the block 110. Although it may be possible to identify similar characters for the entire character set, this embodiment performs identification only for 334 categories of kanji and non-kanji with three strokes or less to which similar characters are concentrated, and, as shown in FIG. 2, constitutes one class for each category for which separate neural networks of NN1–NNn are provided.

In the above, for kanji, identification by the neural networks is limited to those with three strokes or less because characters with four strokes or more can be recognized only by the pattern matching stated in the earlier stage with a relatively favorable ratio. This indicates that, when the time series of the x, y coordinates of characters with four strokes or more is given as data, it can be sufficient information for selecting the only character category from among the templates. This is considered to be a reasonable result because the number of different characters of the same type in the characters with four strokes or more is comparatively few. Therefore, in this embodiment, similar character identification is not carried out on the characters with four strokes or more and the output of the pattern matching is used as a final result as it is.

Learning method of likelihood convertor and neural network:

(a) Creation method of teacher data:

As stated above, to meet with various variations, for example, variations in the number of strokes and stroke order, for the hand written data, 100 samples collected from different writers are prepared for each category. Then, the teacher pattern data is created from the learning hand written character data in the procedure shown below.

(1) The learning hand written character data of all 334 character categories with three strokes or less to be identified in this similar character identification block is input to the pattern matching block 106 stated in the earlier stage. Then, the character in which the normalized distance is within a predetermined threshold is taken as a candidate character. For example, when a pattern of the character ' ま ', is input, those characters such as ' ま ', ' も ', ' ゐ ', and ' ま ', which are difficult to distinguish from ' ま ', are also output as candidate characters in addition to ' ま ', which is the correct answer. As a typical example, the number of candidate characters is 20.

(2) In the candidate characters, the character which agrees with the original character category of the learning pattern is regarded as the 'correct answer,' and the other character categories having patterns which are hardly distinguishable from the correct pattern are all regarded as 'incorrect answers.' For the 100 learning samples of each character, a list of 'incorrect answer' character codes is created. However, the character codes in the list should not be repeated. In general, the learning hand written character data also includes the character pattern variations in the number of strokes. That is to say, that said list of 'incorrect answers' also includes the character codes other than said 334 characters (for example, characters with four strokes) in general. That is, in the list of 'incorrect answers' corresponding to each 'correct answer' character, a list of characters, which are difficult to distinguish from that character, will be generated.

(3) For every 334 characters, 100 samples which will be 'correct answers' are taken from the learning hand written character data as correct pattern data, and 100 samples of each character in the lists of 'incorrect answers' are taken from the learning data, respectively, as incorrect pattern data.

(4) The correct/incorrect pattern data for every 334 characters, which were created above, is taken as teacher pattern data for each neural network learning.

(b) Learning method of neural network:

The characteristic vector mentioned in connection with the block 110 in FIG. 1 is extracted from the correct/incorrect pattern data for each character, which are collected using the method mentioned above. The three-layered feed-forward-type neural network provided for each character shown in FIG. 3 is made to learn by the back-propagation (BP) method shown in D. E. Rummelhart, G. E. Hinton, and R. J. Williams: "Learning Internal Representations by Error Propagation," in Parallel Distributed Processing, Vol. 1, D. E. Rummelhalt and J. L. McClelland (eds.), MIT Press (1986).

Network learning by the BP method is briefly explained below. The neural network learning is materialized by sequentially changing the intensity of linking between the neurons of each layer of the network based on the learning data. To be specific, the output of the network composed of three layers shown in FIG. 3 is:

$$Z = \sigma(V0 + V1 \cdot Y1 + \ldots + Vm \cdot Ym) \quad \text{[Equation 8]}$$

Figure 4:
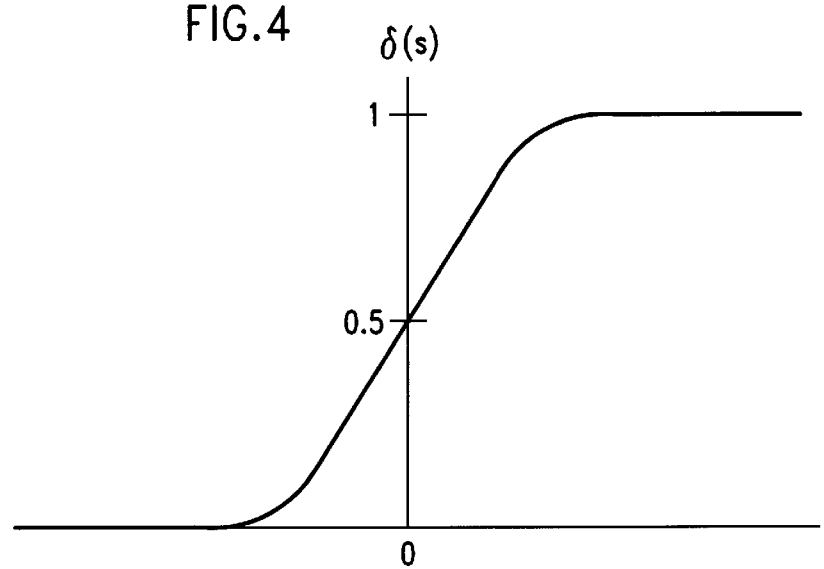
FIG. 4 is a drawing showing a graph of the sigmoid function.

Here, $\sigma(x)$ is a sigmoid function imitating a non-linear exciting characteristic for the input of a neuron such as shown in FIG. 4.

$\sigma(s) = 1/\{1 + \exp(-s)\}$, $Yj$ ($j$ is an integer from 1 to m) is the output of a hidden layer.

$$Yj = \sigma(W0j + W1j \cdot X1 + \ldots + Wnj \cdot Xn) \quad \text{[Equation 9]}$$

Here, $Xi$ (where, $i$ is an integer from 1 to n) is a characteristic vector to be input. In this system, the learning is where the coupling coefficient $Vj$ ($0 \leq j \leq m$) of the output layer and hidden layer and the coupling coefficient $Wij$ ($0 \leq i \leq n$, $0 \leq j \leq m$) of the hidden layer and input layer are adjusted with the process shown below. However, n is the number of neurons in the input layer and m is the number of neurons in the hidden layer. They are 42 and 6, respectively, in the example shown in FIG. 3.

The learning process is carried out as follows.

1) The coupling coefficients $Vj$ and $Wij$ of the network before learning are given in positive or negative random numbers.

2) Correct patterns and incorrect patterns are alternately taken out one by one from the teacher pattern data and given to the input layer. The output for the characteristic vector $Xk$ of the k-th input pattern is taken as $Zk$. In the network before learning, there are no significant differences in the behavior of the output for the correct/incorrect patterns. $Zk$ can take random numbers in an interval [0, 1]. Learning is now carried out by the method shown below so that, for the correct answer, 0.9 is output to the output layer of the third layer, and 0.1 is output when taken out from the incorrect answers. This learning target value is called the teacher signal. (The reason why '1' is not output for the correct answer and '0' for the incorrect answers is that, as understood from FIG. 4, because the sigmoid function $\sigma(s)$ outputs 1 and 0, the arguments s will be $+\infty$ and $-\infty$, respectively. Therefore, to suppress the range of s to finite values, they are determined as 0.9 and 0.1, respectively.)

3) Now, for the output $Zk$ for the input $Xk$, the differences $\delta$ from the output and from the teacher signal (that is, $\delta = Z - 0.9$ for the correct pattern and $\delta = Z - 0.1$ for the incorrect pattern) are obtained. On the basis of these differences, the coupling coefficients for the k-th input are corrected as follows according to the following equations, respectively.

$$Vj(k+1) = Vj(k) - c \cdot \delta \cdot Yj$$

$$Wij(k+1) = Wij(k) - c \cdot \delta 1j \cdot Xi \quad \text{[Equation 10]}$$

Here, c is a small positive integer, and $$\delta ij = \delta \cdot Yj \cdot Yj(1 - Yj) \quad \text{[Equation 11]}$$

It is known that $\delta$ gradually gets close to the minimum value by this correction method. This method is called the back-propagation method because the difference between the output and the teacher signal is input to the output layer opposite to the ordinary input direction, this signal is reversely propagated to the input layer, and it responds to the change in the coupling coefficient by the size of that signal.

4) This operation is performed repeatedly for all the teacher patterns. When both the teacher signal and the average of the square errors of the output signal in the 3rd layer become small enough, the learning is completed.

(c) Likelihood conversion table creation method:

To the neural networks NN1–NNn which have completed learning (FIG. 2), a histogram of output distribution for each neural network NNi (where, i=1 . . . n) is taken by giving the same number of learning pattern data of correct and incorrect answers to the network, which corresponds to class i (in this embodiment, 1 class =1 category) relating to said neural network. In this case, the output takes a value between 0 and 1 according to the pattern data. In this connection, in the stage of creating a list of correct patterns and incorrect patterns stated above, a considerable number of incorrect patterns are obtained compared to the number of correct patterns in general. This can be understood from that, for example, for the correct pattern ' 本 ', a plurality of characters such as ' 本 ', ' 本 ' and ' 本 ' can be obtained as incorrect patterns There can be a case that it is easy to prepare 1900 incorrect patterns for the character ' 本 ', but it is difficult to prepare the same number of correct patterns for the character ' 本 ' as that of incorrect patterns. In this case, 100 correct patterns are prepared for the character ' 本 ' and these correct patterns are repeated 19 times to make the number of correct patterns the same as that of incorrect patterns.

Here, an interval [0, 1] is equally divided into M (M being an integer of two or more), and that the numbers or frequencies of data for the correct/incorrect patterns contained in the i-th interval [(i-1)/M, i/M] are $\mu 1i$ and $\mu 0i$, respectively (where, i=1 . . . M). FIG. 5 shows an example of a histogram drawn in this way.

(a) in FIG. 5 shows an example of a histogram for the correct patterns, and (b) in FIG. 5 shows an example of a histogram for the incorrect patterns. As is clearly understood from these histograms, the histogram for the correct patterns has a high frequency distribution at portions close to the output "1," and the histogram for the incorrect pattern has a high frequency distribution at portions close to the output "0."

In this case, if this network provides an output contained in the i-th interval to unknown pattern data, this pattern is stored as a likelihood conversion table so that the pattern outputs likelihood P1i, which is a category, in an equation P1i=($\mu$1i+1)/($\mu$1i+$\mu$0i +2). Here, the terms "+1" and "+2" of numerator and denominator, respectively, are correction terms to avoid errors in division by zeros in cases where it happens to be that $\mu$1i=$\mu$0i=0 in the i-th interval. In cases where $\mu$1i=$\mu$0i=0, the likelihood convertor is made to be 0.5 by these correction terms, that is, the likelihood of correct answer is equal to that of incorrect answer, and is made so that it cannot be said it is either correct or incorrect. In addition, $\mu$1i and $\mu$0i are normally on the order from tens to several hundreds. Therefore, such correction terms hardly influence the likelihood.

To be specific, the likelihood convertor is configured as follows. That is, the outputs from the neural network are the floating point numbers in an interval between 0 and 1 in general. Therefore, a means for outputting an integer between 0 and 99 by multiplying the input floating point number by 100 and by cutting off decimals is placed in a stage prior to the likelihood convertor. Furthermore, a table having 100 values as entries for said P1i (where, i=0 to 99) is prepared in the likelihood convertor. It is then so constituted that the i-th entry of the table is indexed in response to the output in said earlier stage as i and the value of said P1i is output.

Furthermore, an example in which an interval [0, 1] is equally divided into M was shown above, but the invention is not limited to such interval with equal intervals. The invention can also employ the division into the following intervals:

$$0=a_0<a_i \ldots <a_{i-1}<a_i \ldots <a_{M-1}<a_M=1$$

In this case, the i-th interval becomes $[a_{i-1}, a_i]$. FIG. 6 shows an example of histogram of such an unequally divided interval. In actuality, high frequency distribution is likely to occur at around 0.1 and 0.9. Therefore, it is effective that the intervals including these points be made more dense and the interval with a comparatively lower frequency is made less dense. The table can be looked up with an integer between 0 and 99 obtained by multiplying the input floating point number by 100 and by cutting off decimals even in cases where such an unequally divided interval is used. However, at that time, the table provided in the likelihood convertor can output the same P1i for a different i in cases where the width of the corresponding interval is wider than 0.01. To constitute such a table, an integer $A_1$, obtained by multiplying said $a_i$, by 100 and by cutting off decimals is calculated in advance, and a table such as shown in Table 2 is provided in the likelihood convertor so that the table can be looked up.

TABLE 2

| Integer i | Output likelihood |
|---|---|
| 0 (= $A_0$) | p11 |
| 1 | p11 |
| ... | ... |
| $A_1$ | p12 |
| $A_1$ + 1 | p12 |
| ... | ... |
| $A_2$ | p13 |
| ... | ... |
| $A_N$ | p1M |

Each network is normalized so that it outputs the likelihood by the intervention of such a likelihood convertor, thereby correcting the dispersion of network learning and allowing the outputs of networks to be compared with each other. That is, the category which gives the maximum likelihood can be judged as the most likely candidate.

To make this thing easier to understand, let's take an example such as the following one, which does not use a conventional likelihood convertor. It is assumed that, when a pattern is input to the 1st class neural network and the 2nd class neural network, the 1st class neural network outputs 0.8 and the 2nd class neural network outputs 0.7. In the conventional configuration, there is no other way that the output of the 1st class neural network can be considered to be a more likely candidate. However, in the step for providing a likelihood convertor stated above, when it is assumed that the frequency of the correct pattern in an interval including the value 0.8 is 100 and the frequency of the incorrect pattern is 20 in the 1st class while the frequency of the correct pattern in an interval including the value 0.7 is 200 and the frequency of the incorrect pattern is 10 in the 2nd class, the likelihood of the correct answer in the 1st class neural network is calculated as (100+1)/(100+20 +2)=0.83 and the likelihood of the correct answer in the 2nd class neural network is calculated as (200+1)/(200+10+2)=0.95, resulting in the decision criteria being reversed. It will be understood that the likelihood of appearance of the correct pattern in its output is a more reliable value than the output of the neural network itself.

Furthermore, here is an extreme example. Let's assume that there is one meaningless neural network, which always outputs the large value 0.9 for any input pattern, among the neural network group. In this case, if such a scheme as that where the maximum output value is merely selected is followed, this meaningless neural network will be selected as the most likely candidate even though another neural network among the neural network group outputs a value slightly smaller than the value 0.9. However, with the intervention of a likelihood convertor according to the present invention, the output of this meaningless neural network is always converted into the value 0.5 as understood from FIG. 7. However, the likelihood 0.5 means that the likelihood which agrees with the input pattern and the likelihood which does not agree with it are equal. This means that this value can be regarded as a meaningless value, which does not give any information on pattern matching and can be rejected.

Figure 8:
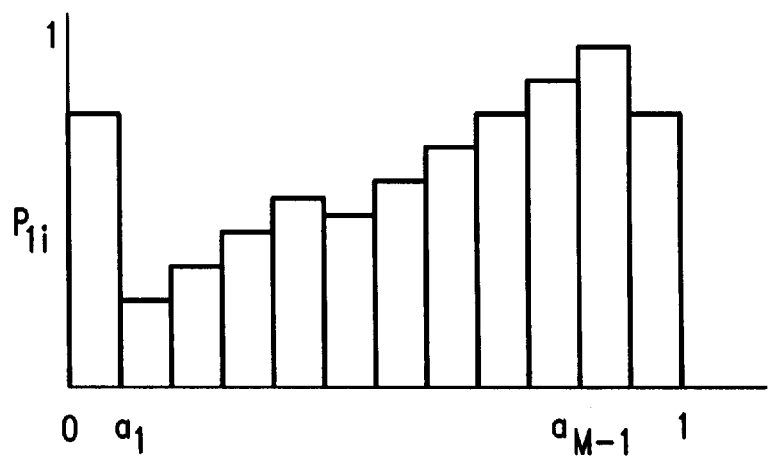
FIG. 8 is a drawing showing an example of output of a likelihood convertor.
Figure 9:
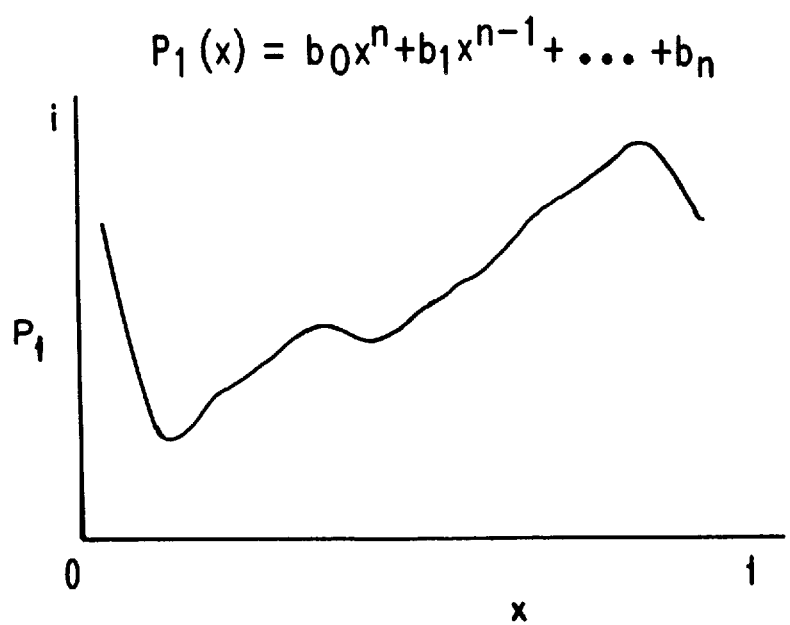
FIG. 9 is a drawing showing an example of cases where a likelihood convertor is formed of a polynomial approximation.

In this connection, in cases where an equally divided interval is used, the values of P1i, which are stored as table entries of the likelihood convertor and are output according to the output from the neural network will be as shown in FIG. 8. In the embodiment stated above, the outputting of the values of P1i according to the output from the neural network is materialized by table look up, but the invention is not limited to this. The curve of P1(x) can also be obtained by polynomial approximation as shown in FIG. 9. In this case, for example, the values of P1i are obtained once in bar chart form such as shown in FIG. 8. Then, the coefficient $b_i$ (where, i=0 . . . n) of polynomial can be determined by widely-known approximation method of least squares using the values of the M set where x=(i-½)/M, P1(x)=P1i (where, i=1 . . . M) based on the polynomial of n-th degree (n<M) shown in FIG. 9. In this way, the polynomial of the result gives a curve graph which interpolates the histogram in FIG. 8. A function to calculate the value of the polynomial thus determined is incorporated in the likelihood convertor. The likelihood convertor outputs a likelihood value based on the output from the neural network by the calculation of polynomial, not by table look up.

(3) Determination method for candidate character and final probability of correct answer In this process, for unknown input patterns and for a plurality of candidates selected in the rough classification interval, the unique correct answer recognition ratios of the following cases were measured for comparison:

(a) the case where a character category which gives a maximum output of the neural network not having a conventional likelihood convertor is a correct answer (conventional technology);

(b) the case where a character category which corrects the output of each network and gives a maximum value using a likelihood convertor according to the invention; and (c) the case where comprehensive judgment of the probability of a correct answer for each candidate character selected in rough classification and the likelihood of each network by Bayes theorem is carried out.

The method of comprehensive judgment by Bayes theorem is as follows. That is, it is assumed that, when the pattern matching interval outputs n candidate characters in response to inputs x (character patterns with three strokes or less) in which the character category is not known, each probability of a correct answer is Pi ($1 \leq i \leq N$). On the other hand, if it is assumed that the likelihood output from each neural network in response to each candidate character is Πi ($1 \leq i \leq N$), the comprehensively judged probability of a correct answer Ri can be obtained by the following equation.

$$Ri = Pi \cdot \Pi i / \{Pi \cdot \Pi i + (1-Pi) \cdot (1-\Pi i)\} \quad \text{[Equation 12]}$$

Of the candidate character categories, the one which gives the maximum comprehensive probability of a correct answer was regarded as a unique correct answer.

For the experiment data, of about 240,000 units of hand written character data in 2384 categories collected from 141 examinees in advance, a template for pattern matching was created as learning data with the omission of about 32,000 units of character data for the portion of 20 people for the recognition test. In addition, among them, the data with three strokes or less (334 categories) was taken as learning data for a similar character recognition interval, and was made to learn each neural network of the 334 categories and the likelihood conversion table in the method stated above. The online hand written character recognition system including the pattern recognition interval and the similar character recognition interval was materialized with software on PS/55, which is an IBM personal computer.

Table 3 shows the results. In Table 3, the recognition ratio for each input character type is described, but the recognition is carried out for all 2384 categories of character types. Therefore, when the character of the same type is regarded as the first candidate, for example, ' ヲ ' (katakana) for the input of ' 乎 ' (kanji) or '0' (number) for 'O' (alphabet), it is treated as a wrong recognition.

TABLE 3

Recognition ratio evaluation result by similar character recognition

|  | (a) NN without likelihood conversion | (b) NN With likelihood conversion | (c) PM + NN Total judgment | Improvement of recognition ratio (b) − (a) | (c) − (a) |
|---|---|---|---|---|---|
| Hiragana | 87.5% | 88.9% | 89.5% | +0.8% | +2.0% |
| Katakana | 84.5% | 84.7% | 89.3% | +0.2% | +4.8% |
| Alphabet upper case | 87.0% | 84.4% | 88.2% | −2.6% | +1.2% |
| Alphabet lower case | 81.5% | 83.1% | 86.5% | +1.6% | +5.0% |

TABLE 3-continued

Recognition ratio evaluation result by similar character recognition

|  | (a) NN without likelihood conversion | (b) NN With likelihood conversion | (c) PM + NN Total judgment | Improvement of recognition ratio (b) − (a) | (c) − (a) |
|---|---|---|---|---|---|
| Numeral | 78.0% | 87.3% | 88.3% | +9.3% | +10.3% |
| Symbol | 79.2% | 82.3% | 86.2% | +3.1% | +7.0% |
| Total (*) | 84.2% | 85.2% | 88.4% | +1.0% | +4.2% |

(*) Total evaluation of above-mentioned six character types

As stated above, compared to the conventional method (1), which does not use a likelihood convertor, methods (2) and (3) using the present invention show a remarkable improvement for lower-case alphabets, numbers, and symbols, in which lowering of the recognition ratio due to the influence of similar characters is remarkable. The efficiency of a neural network group in carrying out the likelihood conversion shown in this invention was confirmed.

In the embodiment, it was made possible to obtain such performance that can stand sufficiently practical use in terms of software execution by applying various ideas, such as performing floating point operations of the neural network interval by integer operation. For example, the similar character recognition speeds for hiragana, katakana, and alphanumerics on an IBM 5580 Y model personal computer become 48 msec., 46 msec., and 40 msec., per character, respectively.

Another example to which the present invention is applied.

In addition to the online handwritten Japanese character recognition described in this embodiment, the invention is widely applied to the cases where a feed-forward type neural network is used for recognition in pattern recognition composed of a number of categories. The following are examples.

1) Shading images; for example, identification of human faces,
2) Handwritten or printed character OCR,
3) Voice recognition
4) Expectation of economic fluctuation, for example, time series patterns, such as fluctuation of stock prices.

As stated above, according to the invention, in the pattern recognition system, the output from the neural network group at an input of a pattern is not used as it is as the probability of a correct answer of pattern recognition. It is so arranged that this output is input once to the likelihood convertor and the output is converted there into the likelihood which is a value corresponding to the correct pattern and the correctness of the pattern matching is judged with this likelihood. Therefore, it becomes possible to compensate the dispersion of the outputs between neural networks in the neural network group and judge each neural network in the neural network group under the unified reference value, thereby improving the recognition ratio of pattern matching.

We claim:

1. A pattern recognition system using a neural network comprising:

(a) a neural network having been made to learn to output different output values in response to the input of different input patterns; and (b) a likelihood convertor for receiving the output value of said neural network and outputting a likelihood value corresponding thereto, the likelihood value being an empirically determined probability that an input pattern which produces the neural network output value received by the likelihood convertor corresponds to a correct pattern match, wherein the output of said neural network is between 0 and 1, wherein when the output value of the neural network is in the i-th interval ($a_{i-1}$, $a_i$), the likelihood convertor outputs likelihood value P1i (where, i=1 . . . M) when the output interval (0, 1) is divided into M (M being an integer of two or more) by the values of $0 = a_0 < a_1 \ldots < a_{i-1} < a_i \ldots < a_{M-1} < a_M = 1$, and wherein, when the frequencies of the correct and incorrect pattern data contained in said i-th interval ($a_{i-1}$, $a_i$) are $\mu 1i$ and $\mu 0i$, respectively, said likelihood value P1i is output as a value calculated by $P1i = (\mu 1i + 1)/(\mu 1i + \mu 0i + 2)$.

2. A pattern recognition system using a neural network comprising:

(a) a neural network having been made to learn to output different output values in response to the input of different input patterns; and (b) a likelihood convertor for receiving the output value of said neural network and outputting a likelihood value corresponding thereto, the likelihood value being an empirically determined probability that an input pattern which produces the neural network output value received by the likelihood convertor corresponds to a correct pattern match, wherein the output of said neural network is between 0 and 1, wherein when the output value of the neural network is in the i-th interval ($a_{i-1}$, $a_i$), the likelihood convertor outputs likelihood value P1i (where, i=1 . . . M) when the output interval (0, 1) is divided into M (M being an integer of two or more) by the values of $0 = a_0 < a_1 \ldots < a_{i-1} < a_i \ldots < a_{M-1} < a_M = 1$, and wherein said ($a_{i-1}$, $a_i$) is an interval with equal intervals of ((i−1)/M, i/M) (where, i=1 . . . M).

3. A pattern recognition system using a neural network comprising:

(a) a plurality of neural networks having been made to learn to output different output values in response to input of different input patterns and each neural network corresponding to a different class of patterns to be recognized;

b) a plurality of likelihood convertors, each likelihood convertor being coupled to a different one of said neural networks for receiving the output value thereof and outputting a likelihood value corresponding thereto, the likelihood value outputted by each likelihood convertor being an empirically determined probability that an input pattern which produces the neural network output value received by said each likelihood convertor corresponds to a correct pattern match; and (c) means for inputting a pattern to be recognized to the plurality of neural networks, wherein the class of said neural network coupled to the likelihood convertor which outputs the maximum likelihood value is judged to be the recognized class, wherein the output of said neural networks is between 0 and 1, and wherein when the output value of a neural network is in the i-th interval ($a_{i-1}$, $a_i$), the likelihood convertor coupled thereto outputs likelihood value P1i (where, i=1 . . . M) when the output interval (0, 1) is divided into M (M being an integer of two or more) by the values of $0 = a_0 < a_1 \ldots < a_{i-1} < a_i \ldots < a_{M-1} < a_M = 1$, and wherein, when the frequencies of the correct and incorrect pattern data contained in said i-th interval ($a_{i-1}$, $a_i$) are $\mu 1i$ and $\mu 0i$, respectively, said likelihood value P1i is output as a value calculated by $P1i = (\mu 1i + 1)/(\mu 1i + \mu 0i + 2)$.

4. A pattern recognition system using a neural network comprising:

(a) a plurality of neural networks having been made to learn to output different output values in response to input of different input patterns and each neural network corresponding to a different class of patterns to be recognized;

b) a plurality of likelihood convertors, each likelihood convertor being coupled to a different one of said neural networks for receiving the output value thereof and outputting a likelihood value corresponding thereto, the likelihood value outputted by each likelihood convertor being an empirically determined probability that an input pattern which produces the neural network output value received by said each likelihood convertor corresponds to a correct pattern match; and (c) means for inputting a pattern to be recognized to the plurality of neural networks, wherein the class of said neural network coupled to the likelihood convertor which outputs the maximum likelihood value is judged to be the recognized class, wherein the output of said neural networks is between 0 and 1, and wherein when the output value of a neural network is in the i-th interval ($a_{i-1}$, $a_i$), the likelihood convertor coupled thereto outputs likelihood value P1i (where, i=1 . . . M) when the output interval (0, 1) is divided into M (M being an integer of two or more) by the values of $0 = a_0 < a_1 \ldots < a_{i-1} < a_i \ldots < a_{M-1} < a_M = 1$, and wherein said ($a_{i-1}$, $a_i$) is an interval with equal intervals of ((i−1)/M, i/M) (where, i=1 . . . M).

5. A pattern recognition system using a neural network comprising:

(a) a pattern matching means for comparing an input pattern to be recognized with a template prepared in advance and giving a probability of a correct pattern match for each different class to be recognized;

(b) a plurality of neural networks having been made to learn to output different output values in response to input of different input patterns, each neural network corresponding to a different class of patterns to be recognized;

(c) a plurality of likelihood convertors, each separately coupled to one of said neural networks for receiving the output value thereof and outputting a likelihood value corresponding thereto, the likelihood value outputted by each likelihood converter being an empirically determined probability that an input pattern which produces the neural network output value received by said each likelihood convertor corresponds to a correct pattern match; and (d) a means for combining the probability of a correct pattern match for each class given by said pattern matching means and said likelihood value output for each class by said likelihood convertors by Bayes theorem to give a conditional probability, wherein the class of said neural network corresponding to a maximum given conditional probability is judged to be the recognized class, wherein the output of said neural networks is between 0 and 1, and wherein when the output value of a neural network is in the i-th interval $(a_{i-1}, a_i)$ the coupled likelihood convertor outputs likelihood value P1i (where, i=1 . . . M) when the output interval (0, 1) is divided into M (M being an integer of two or more) by the values of $0=a_0<a_1 \ldots <a_{i-1}<a_i \ldots <a_{M-1}<a_M=1$, and wherein, when the frequencies of the correct and incorrect pattern data contained in said i-th interval $(a_{i-1}, a_i)$ are $\mu 1i$ and $\mu 0i$, respectively, said likelihood value P1i is output as a value calculated by $P1i=(\mu 1i+1)/(\mu 1i+\mu 0i+2)$.

6. A pattern recognition apparatus using a neural network comprising:

(a) a pattern matching means for comparing an input pattern to be recognized with a template prepared in advance and giving a probability of a correct pattern match for each different class to be recognized;

(b) a plurality of neural networks having been made to learn to output different output values in response to input of different input patterns, each neural network corresponding to a different class of patterns to be recognized;

(c) a plurality of likelihood convertors, each separately coupled to one of said neural networks for receiving the output value thereof and outputting a likelihood value corresponding thereto, the likelihood value outputted by each likelihood converter being an empirically determined probability that an input pattern which produces the neural network output value received by said each likelihood convertor corresponds to a correct pattern match; and (d) a means for combining the probability of a correct pattern match for each class given by said pattern matching means and said likelihood value output for each class by said likelihood convertors by Bayes theorem to give a conditional probability, wherein the class of said neural network corresponding to a maximum given conditional probability is judged to be the recognized class, wherein the output of said neural networks is between 0 and 1, and wherein when the output value of a neural network is in the i-th interval $(a_{i-1}, a_i)$, the coupled likelihood convertor outputs likelihood value P1i (where, i=1 . . . M) when the output interval (0, 1) is divided into M (M being an integer of two or more) by the values of $0=a_0<a_1 \ldots <a_{i-1}<a_i \ldots <a_{M-1}<a_M=1$, and wherein said $(a_{i-1}, a_i)$ is an interval with equal intervals of $((i-1)/M, i/M)$ (where, i-1 . . . M).

7. A pattern recognition method using a neural network comprising the steps of:

(a) preparing a plurality of correct patterns and incorrect patterns to be recognized by a neural network:

(b) making the neural network learn to output "1" or a value close to "1" for at least some of the correct patterns and "0" or a value close to "0" for at least some of the incorrect patterns;

(c) dividing the output range (0, 1) of the neural network into M (M being an integer of two or more) intervals $0=a_0<a_1 \ldots <a_{i-1}<a_i \ldots <a_{M-1}<a_M=1$;

(d) inputting to the neural network a plurality of the correct patterns and incorrect patterns in nearly the same number;

(e) counting the number or frequency of correct and incorrect patterns that produce an output value of the neural network in each i-th interval $(a_{i-1}, a_i)$;

(f) storing the counted number or frequency of correct and incorrect patterns as $\mu 1i$ and $\mu 0i$ (where, i=1 . . . M), respectively; and (g) calculating and storing a likelihood value P1i from the values of $\mu 1i$ and $\mu 0i$ for each i-th interval, thereby forming a likelihood conversion table, each P1i being a probability that an input pattern which produces an output value from the neural network in the i-th interval corresponds to a correct pattern match, wherein the output of said neural network is enabled to be converted to a correct probability P1i in response to the output of said neural network being in the interval $(a_{i-1}, a_i)$.

8. The pattern recognition system using a neural network as set forth in claim 7, wherein said likelihood value P1i is calculated as $P1i=(\mu 1i+1)/(\mu 1i+\mu 0i+2)$.

9. The pattern recognition method having a neural network as set forth in claim 7, wherein said $(a_{i-1}, a_i)$ is an interval with equal intervals of (i-1)/M, i/M) (where, i=1 . . . M).

10. A pattern recognition system using a neural network comprising:

(a) a neural network having been made to learn to output different output values in response to the input of different input patterns; and (b) a likelihood convertor for receiving the output value of said neural network and outputting a likelihood value corresponding thereto the likelihood value being an empirically determined probability that an input pattern which produces the neural network output value received by the likelihood convertor corresponds to a correct pattern match, wherein the likelihood value is the number of times plus one that the neural network produced said output value from inputted learning pattern data when there was a correct pattern match divided by the total number of times plus two that the neural network produced that output value from the inputted learning pattern data.

* * * * *